(12) United States Patent
Uchibori et al.

(10) Patent No.: US 12,269,418 B2
(45) Date of Patent: Apr. 8, 2025

(54) WEBBING TAKE-UP DEVICE

(71) Applicant: KABUSHIKI KAISHA TOKAI-RIKA-DENKI-SEISAKUSHO, Aichi (JP)

(72) Inventors: Hayato Uchibori, Aichi (JP); Yoshiteru Sakaguchi, Aichi (JP); Masanori Nagamine, Aichi (JP); Yuta Suzuki, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 273 days.

(21) Appl. No.: 17/924,289

(22) PCT Filed: Apr. 23, 2021

(86) PCT No.: PCT/JP2021/016463
§ 371 (c)(1),
(2) Date: Nov. 9, 2022

(87) PCT Pub. No.: WO2021/230046
PCT Pub. Date: Nov. 18, 2021

(65) Prior Publication Data
US 2023/0192028 A1 Jun. 22, 2023

(30) Foreign Application Priority Data
May 13, 2020 (JP) .................. 2020-084786

(51) Int. Cl.
*B60R 22/38* (2006.01)
(52) U.S. Cl.
CPC .................... *B60R 22/38* (2013.01)
(58) Field of Classification Search
CPC ............... B60R 22/38; B60R 22/4633; B60R 2022/468; B60R 2022/4647
See application file for complete search history.

(56) References Cited

U.S. PATENT DOCUMENTS

| | | | |
|---|---|---|---|
| 2020/0231115 A1* | 7/2020 | Tanaka | B60R 22/4633 |
| 2020/0384946 A1 | 12/2020 | Tanaka et al. | |
| 2021/0114549 A1* | 4/2021 | Yanagawa | B60R 22/4628 |

FOREIGN PATENT DOCUMENTS

WO 2019/026426 A1 2/2019

* cited by examiner

*Primary Examiner* — Sang K Kim
(74) *Attorney, Agent, or Firm* — Studebaker Brackett PLLC

(57) ABSTRACT

A webbing take-up device including: a spool; a rotating member configured such that the spool is rotated in a take-up direction by the rotating member being rotated toward one side; a cylinder open at an axial direction leading end side; a fluid supplier provided at an axial direction base end side of the cylinder and supplying a fluid inside the cylinder in a vehicle emergency; a moving member provided inside the cylinder, moved toward the axial direction leading end side of the cylinder due to pressure of the fluid, and rotating the rotating member toward the one side by being moved in a state in which a tooth of the rotating member has bitten into or pierced the moving member; and a stopper provided further toward a movement direction side of the moving member than a section where the tooth of the rotating member has bitten into or pierced the moving member, the stopper being pressed by a portion of the moving member where the biting into or piercing of the rotating member has been disengaged, the stopper being engaged by teeth of the rotating member, and the stopper suppresses rotation of the rotating member toward the one side by the stopper being moved toward the section where teeth of the rotating member bite into or pierce the moving member.

4 Claims, 9 Drawing Sheets

WEBBING TAKE-UP DEVICE

TECHNICAL FIELD

The present invention relates to a webbing take-up device in which a spool is rotated in a take-up direction by rotating a rotating member.

BACKGROUND ART

For example, a webbing take-up device disclosed in International Publication (WO) No. 2019/026426 includes a stopper. A moving member is moved toward its length direction leading end side, and the stopper is pressed and moved by a length direction leading end side portion of the moving member. When the stopper is moved, the stopper enters a section where teeth of the rotating member have bitten into or pierced the moving member. Rotation of the rotating member is suppressed thereby, and movement of the moving member is suppressed thereby.

In such a configuration, the stopper is preferably able to move stably toward the section where the teeth of the rotating member have bitten into or pierced the moving member.

SUMMARY OF INVENTION

Technical Problem

In consideration of the above circumstances, an object of the present invention is to obtain a webbing take-up device in which the stopper is able to move stably toward a section where the teeth of the rotating member have bitten into or pierced the moving member.

Solution to Problem

A webbing take-up device of a first aspect of the present disclosure includes: a spool on which webbing of a seatbelt device is taken up by the spool being rotated in a take-up direction; a rotating member configured such that the spool is rotated in the take-up direction by the rotating member being rotated toward one side; a tube-shaped cylinder open at an axial direction leading end side; a fluid supplier provided at an axial direction base end side of the cylinder and supplying a fluid inside the cylinder in a vehicle emergency; a moving member that is provided inside the cylinder, that is moved toward the axial direction leading end side of the cylinder due to pressure of the fluid, and that rotates the rotating member toward the one side by being moved in a state in which a tooth of the rotating member has bitten into or pierced the moving member; and a stopper that is provided further toward a movement direction side of the moving member than a section where the tooth of the rotating member has bitten into or pierced the moving member, the stopper being pressed by a portion of the moving member where the biting into or piercing of the rotating member has been disengaged, the stopper being engaged by teeth of the rotating member, and the stopper suppresses rotation of the rotating member toward the one side by the stopper being moved toward the section where the teeth of the rotating member bite into or pierce the moving member.

In the webbing take-up device of the first aspect of the present disclosure, the stopper is moved toward the section where the teeth of the rotating member bite into or pierce the moving member when the stopper is pressed by the moving member and also engaged by the teeth of the rotating member. The rotation of the rotating member toward the one side is accordingly suppressed by the stopper when the stopper is moved toward the section where the teeth of the rotating member bite into or pierce the moving member. Due to the teeth of the rotating member being engaged with the stopper in this manner, the stopper is able to move by rotation of the rotating member This accordingly enables the stopper to move stably toward the section where the teeth of the rotating member bite into or pierce the moving member.

A webbing take-up device of a second aspect of the present disclosure is the webbing take-up device of the first aspect of the present disclosure, wherein the stopper includes a resistance portion that resists compression by the rotating member and the moving member. Rotation of the rotating member toward the one side is suppressed by the resistance portion that has been interposed between the rotating member and the moving member.

In the webbing take-up device of the second aspect of the present disclosure, the stopper includes the resistance portion. The resistance portion is able to resist compression by the rotating member and the moving member. The rotation of the rotating member toward the one side can be suppressed by the resistance portion that has been interposed between the rotating member and the moving member.

A webbing take-up device of a third aspect of the present disclosure is the webbing take-up device of the second aspect of the present disclosure, wherein the resistance portion is harder than a teeth-engagement portion of the stopper.

In the webbing take-up device of the third aspect of the present disclosure, the resistance portion of the stopper is harder than a teeth-engagement portion of the stopper. The resistance portion is accordingly able to resist compression by the rotating member and the moving member, and the teeth-engagement portion of the stopper engages with the teeth of the rotating member.

A webbing take-up device of a fourth aspect of the present disclosure includes: a spool on which webbing of a seatbelt device is taken up; a rotating member connected to the spool and rotating toward one side such that the spool is rotated in the take-up direction, the rotating member being formed with plural teeth around a rotation axis of the rotating member; a tube-shaped cylinder open at an axial direction leading end side; a fluid supplier provided at an axial direction base end side of the cylinder and supplying a fluid inside the cylinder in a vehicle emergency; a moving member that is provided inside the cylinder, that is moved toward the axial direction leading end side of the cylinder due to pressure of the fluid; and a stopper provided further toward a movement direction side of the moving member than the leading end portion of the moving member. The moving member rotates the rotating member toward the one side by the moving member that is moved further in a state in which a leading end portion of the moving member has come out from the cylinder and a tooth of the rotating member has bitten into or pierced the leading end portion. Along with movement of the moving member, the leading end portion of the moving member, at which the biting into or piercing of the rotating member has been disengaged, presses the stopper. And the stopper is engaged by teeth of the rotating member, is moved toward a section where teeth of the rotating member bite into or pierce the moving member, and suppresses rotation of the rotating member toward the one side by the moving member.

In the webbing take-up device of the fourth aspect of the present disclosure, the stopper is moved toward the section where the teeth of the rotating member bite into or pierce the moving member when the stopper is pressed by the moving member and also engaged by the teeth of the rotating member. The rotation of the rotating member toward the one side is suppressed by the stopper when the stopper is moved toward the section where the teeth of the rotating member bite into or pierce the moving member. The stopper is able to be moved by rotation of the rotating member due to teeth of the rotating member being engaged with the stopper. This accordingly enables the stopper to move stably toward the section where the teeth of the rotating member bite into or pierce the moving member.

The webbing take-up device of a fifth aspect of the present disclosure is the webbing take-up device of the fourth aspect of the present disclosure, wherein the stopper includes a hard portion and a soft portion; the soft portion is engaged by the teeth of the rotating member and is moved to a section where the teeth of the rotating member bite into or pierce the moving member; and the hard portion suppresses rotation of the rotating member toward the one side by the moving member.

In the webbing take-up device of the fifth aspect of the present disclosure, the stopper includes the hard portion and the soft portion. The hard portion is able to suppress rotation of the rotating member toward the one side by the hard portion being moved to the section where the teeth of the rotating member bite into or pierce the moving member.

A webbing take-up device of a sixth aspect of the present invention is the webbing take-up device of the fifth aspect of the present disclosure, wherein the hard portion is harder than the teeth of the rotating member.

In the webbing take-up device of the sixth aspect of the present disclosure, the hard portion of the stopper is harder than the teeth of the rotating member. Such a hard portion is able to suppress rotation of the rotating member toward the one side by the hard portion that is moved toward the section where the teeth of the rotating member bite into or pierce the moving member.

Advantageous Effects of Invention

As described above, the webbing take-up device according to the present invention enables a stopper to move stably toward a section where a tooth of the rotating member has bitten into or pierced the moving member.

DESCRIPTION OF EMBODIMENTS

Figure 1:
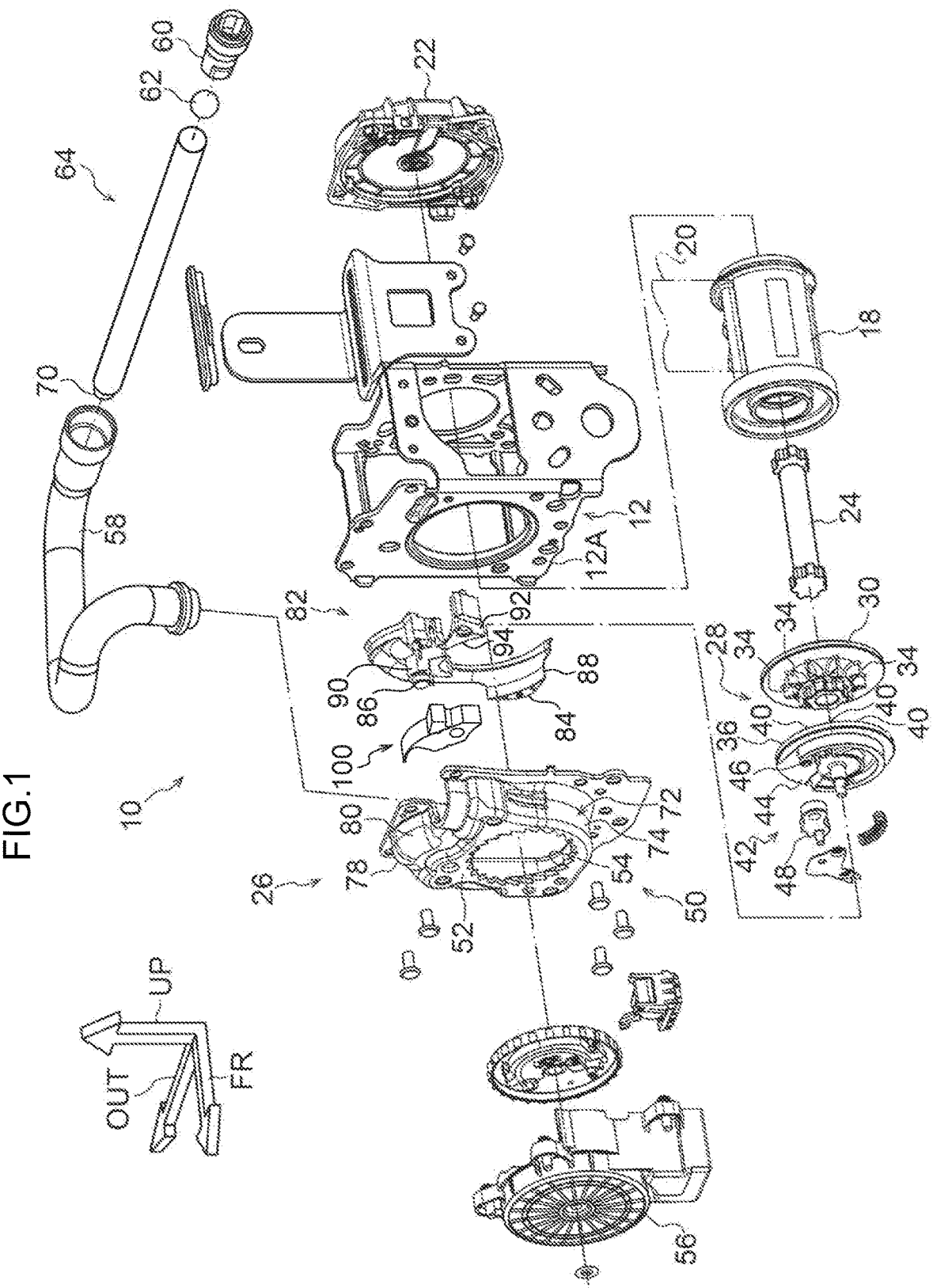
FIG. 1 is an exploded perspective view illustrating a webbing take-up device according to a first exemplary embodiment.

Explanation follows regarding exemplary embodiments of the present invention, with reference to FIG. 1 to FIG. 9. Note that in each of the drawings, the arrow FR indicates a vehicle front side, the arrow OUT indicates a vehicle width direction outer side, and the arrow UP indicates a vehicle upper side of a vehicle applied with a webbing take-up device 10. Moreover, in each of the drawings, the arrow A indicates a take-up direction, this being a rotation direction of a spool 18 when the spool 18 takes up a webbing 20, and the arrow B indicates a pull-out direction, this being the opposite direction to the take-up direction. Furthermore, the arrow C indicates a movement direction of a stopper 100 at a length direction leading end side of the stopper 100.

Note that in the following explanation of the exemplary embodiments, in cases in which a subsequent exemplary embodiment has basically the same locations as those of an exemplary embodiment that has already been described, the same reference numerals are allocated thereto and detailed explanation thereof is omitted.

Configuration of First Exemplary Embodiment

As illustrated in FIG. 1, the webbing take-up device 10 according to the present exemplary embodiment includes a frame 12. The frame 12 is fixed to a vehicle lower side portion of a center pillar (not illustrated in the drawings), serving as a vehicle body of the vehicle.

The spool 18 is provided to the frame 12. The spool 18 is formed in a substantially circular tube shape, and is capable of rotating about its center axis (in the arrow A direction and arrow B direction in FIG. 3, etc.). A length direction base end portion of the elongated belt-shaped webbing 20 is anchored to the spool 18. The webbing 20 is taken up onto the spool 18 from its length direction base end side when the spool 18 is rotated in the take-up direction (the arrow A direction in FIG. 3, etc.). A length direction leading end side of the webbing 20 extends from the spool 18 toward the vehicle upper side, passes through a slit formed in a through anchor (not illustrated in the drawings) supported by the center pillar at the vehicle upper side of the frame 12, and folds back on itself toward the vehicle lower side.

Furthermore, a length direction leading end portion of the webbing 20 is anchored to an anchor plate (not illustrated in the drawings). The anchor plate is formed of a sheet metal material such as a ferrous metal, and is fixed to a floor section (not illustrated in the drawings) of the vehicle, or to a framework member or the like of a seat (not illustrated in the drawings) applied with the webbing take-up device 10.

A vehicle seatbelt device applied with the webbing take-up device 10 also includes a buckle device (not illustrated in the drawings). The buckle device is provided at an inner side in the vehicle width direction of the seat (not illustrated in the drawings) applied with the webbing take-up device 10. In a state in which the webbing 20 has been wrapped across the body of an occupant seated in the seat, a tongue (not illustrated in the drawings) provided to the webbing 20 is engaged with the buckle device, such that the webbing 20 is worn over the body of the occupant.

As illustrated in FIG. 1, a spring housing 22 is provided at the vehicle rear side of the frame 12. A spool biasing means such as a flat spiral spring (not illustrated in the drawings) is provided inside the spring housing 22. The spool biasing member either directly or indirectly engages with the spool 18, such that the spool 18 is biased in the take-up direction (the arrow A direction in FIG. 1, etc.) by the biasing force of the spool biasing member.

The webbing take-up device 10 also includes a torsion bar 24 configuring a force limiter mechanism. A vehicle rear side portion of the torsion bar 24 is disposed inside the spool 18 and is linked to the spool 18 in a state in which rotation of the torsion bar 24 relative to the spool 18 is limited. A vehicle front side portion of the torsion bar 24 passes through a hole formed in the frame 12 and extends toward the outside (vehicle front side) of the frame 12.

Figure 2:
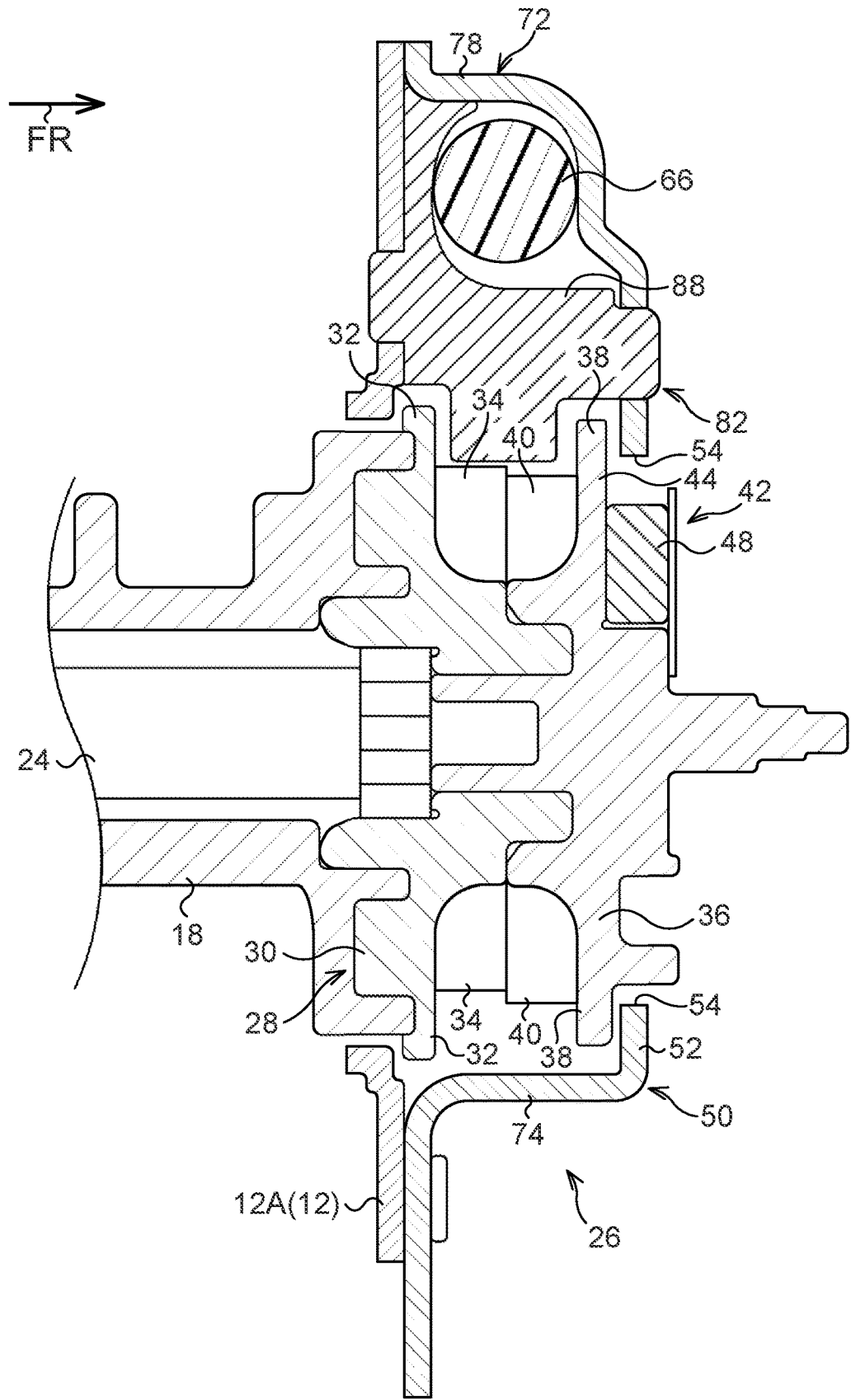
FIG. 2 is a cross-section sectioned along line 2-2 in FIG. 3.

A rotating member 28 of a pre-tensioner 26 is provided at the vehicle front side of the frame 12. As illustrated in FIG. 1 and FIG. 2, the rotating member 28 includes a first rotating section 30. The first rotating section 30 is disposed coaxially to the spool 18. The vehicle front side portion of the torsion bar 24 is coupled to the first rotating section 30, such that the rotating member 28 is limited from rotating relative to the vehicle front side portion of the torsion bar 24.

The first rotating section 30 of the rotating member 28 includes a first flange 32. The first flange 32 is formed in a circular plate shape. A thickness direction of the first flange 32 corresponds to the vehicle front and rear directions (the arrow FR direction and the opposite direction thereto in FIG. 1 and FIG. 2). First teeth 34 serving as plural teeth portions are provided at the vehicle front side (the arrow FR direction side in FIG. 1 and FIG. 2) of the first flange 32. The first teeth 34 are arranged at predetermined intervals around a center axis of the first flange 32 (namely, around a center axis of the first rotating section 30), and are integrally formed to the first flange 32.

Furthermore, as illustrated in FIG. 2, the rotating member 28 is configured of both the first rotating section 30 and a second rotating section 36 that is provided at the vehicle front side of the first rotating section 30. The second rotating section 36 includes a second flange 38. The second flange 38 is formed in a circular plate shape. The second flange 38 has the same shape as the first flange 32, and is disposed coaxially to the first flange 32 at the vehicle front side of the first rotating section 30 so as oppose the first flange 32.

Second teeth 40 serving as plural teeth portions are provided at the vehicle rear side of the second flange 38 (the opposite side to the arrow FR direction side in FIG. 1 and FIG. 2) so as to be disposed at the vehicle front side of the first teeth 34 of the first rotating section 30. The second teeth 40 are integral to the second flange 38. The second teeth 40 are formed at predetermined intervals around a center axis of the second rotating section 36. As viewed along the center axis direction of the rotating member 28, each of the second teeth 40 is disposed at substantially the center between adjacent first teeth 34 of the first rotating section 30 that are adjacent to one another about the center axis of the first rotating section 30. In this state, the second rotating section 36 is coupled to the first rotating section 30, such that movement of the second rotating section 36 relative to the first rotating section 30 is limited.

A vehicle front side portion of the second rotating section 36 configures a lock base 44 of a locking mechanism 42. The lock base 44 includes a lock pawl 48. The lock pawl 48 is supported by a boss 46 formed at the lock base 44, and is capable of swinging centered on the boss 46.

A cover plate 50 that configures both the locking mechanism 42 and the pre-tensioner 26 is fixed to a leg plate 12A on the vehicle front side of the frame 12. The cover plate 50 is open toward the vehicle rear side, and a bottom plate 52 of the cover plate 50 opposes the frame 12 in a state spaced apart from the vehicle front side of the frame 12. A ratchet hole 54 is formed in the bottom plate 52. Ratchet teeth are formed at an inner peripheral portion of the ratchet hole 54. When the lock pawl 48 of the lock base 44 is swung in one direction about the boss 46, a leading end portion of the lock pawl 48 meshes with the ratchet teeth of the ratchet hole 54. Rotation of the lock base 44 in the pull-out direction (the arrow B direction in FIG. 1, etc.) is thereby limited, such that rotation of the spool 18 in the pull-out direction is indirectly limited.

A sensor holder 56 of the locking mechanism 42 is provided at the vehicle front side of the cover plate 50. The sensor holder 56 is open toward the vehicle rear side, and is either directly fixed to the frame 12, or indirectly fixed thereto through the cover plate 50. Respective components configuring a sensor mechanism to detect an emergency state of the vehicle are housed inside the sensor holder 56. When the sensor mechanism inside the sensor holder 56 is actuated in a vehicle emergency, the lock pawl 48 of the lock base 44 is swung in the one direction about the boss 46 coordinated with rotation of the lock base 44 of the locking mechanism 42 in the pull-out direction.

The webbing take-up device 10 includes a cylinder 58 serving as a tube-shaped member configuring the pre-tensioner 26. The cylinder 58 is formed in a circular tube shape, with an axial direction base end portion of the cylinder 58 disposed at the vehicle upper-rear side of the frame 12. A micro gas generator 60 (the micro gas generator 60 is hereafter referred to as the "MGG 60") serving as a fluid supply means is inserted into the axial direction base end portion of the cylinder 58. The MGG 60 is electrically connected to a collision detection sensor provided at the vehicle via an ECU serving as a control means (none of which are illustrated in the drawings). The MGG 60 is actuated by the ECU when the collision detection sensor has detected an impact during a vehicle collision, such that gas serving as an example of a fluid generated in the MGG 60 is supplied inside the cylinder 58.

A sealing ball 62 serving as a piston is disposed inside the cylinder 58 of the pre-tensioner 26. The sealing ball 62 is formed of a synthetic resin material, and the shape of the sealing ball 62 is a substantially spherical shape in a state in which load is not being imparted to the sealing ball 62. The sealing ball 62 partitions the space inside the cylinder 58 into a space further toward the axial direction base end side than the sealing ball 62 and a space further toward an axial direction leading end side than the sealing ball 62.

When the MGG 60 is actuated, gas generated by the MGG 60 is supplied into the cylinder 58 between the MGG 60 and the sealing ball 62. When the internal pressure of the cylinder 58 between the MGG 60 and the sealing ball 62 rises as a result, the sealing ball 62 is moved toward the axial direction leading end side of the cylinder 58 and is compressed and deformed in the axial direction of the cylinder 58.

A moving member 64 is disposed inside the cylinder 58. The moving member 64 is formed of a synthetic resin material, and is capable of deforming on being subjected to an external force. The moving member 64 is disposed further toward the axial direction leading end side of the cylinder 58 than the sealing ball 62. Thus, when the sealing ball 62 is moved toward the axial direction leading end side of the cylinder 58, the moving member 64 is pressed by the sealing ball 62 and is moved toward the axial direction leading end side of the cylinder 58. The moving member 64 is further formed in a cylindrical rod shape.

An axial direction intermediate portion of the cylinder 58 is bent, with the axial direction leading end portion of the cylinder 58 disposed at the vehicle upper-front side of the vehicle front side of the frame 12 so as to be retained interposed between the cover plate 50 and the frame 12. The axial direction leading end of the cylinder 58 is open toward a side that is substantially the vehicle lower side (in other words, toward a side in a direction sloped toward the vehicle width direction outer side with respect to the vehicle lower side).

Figure 3:
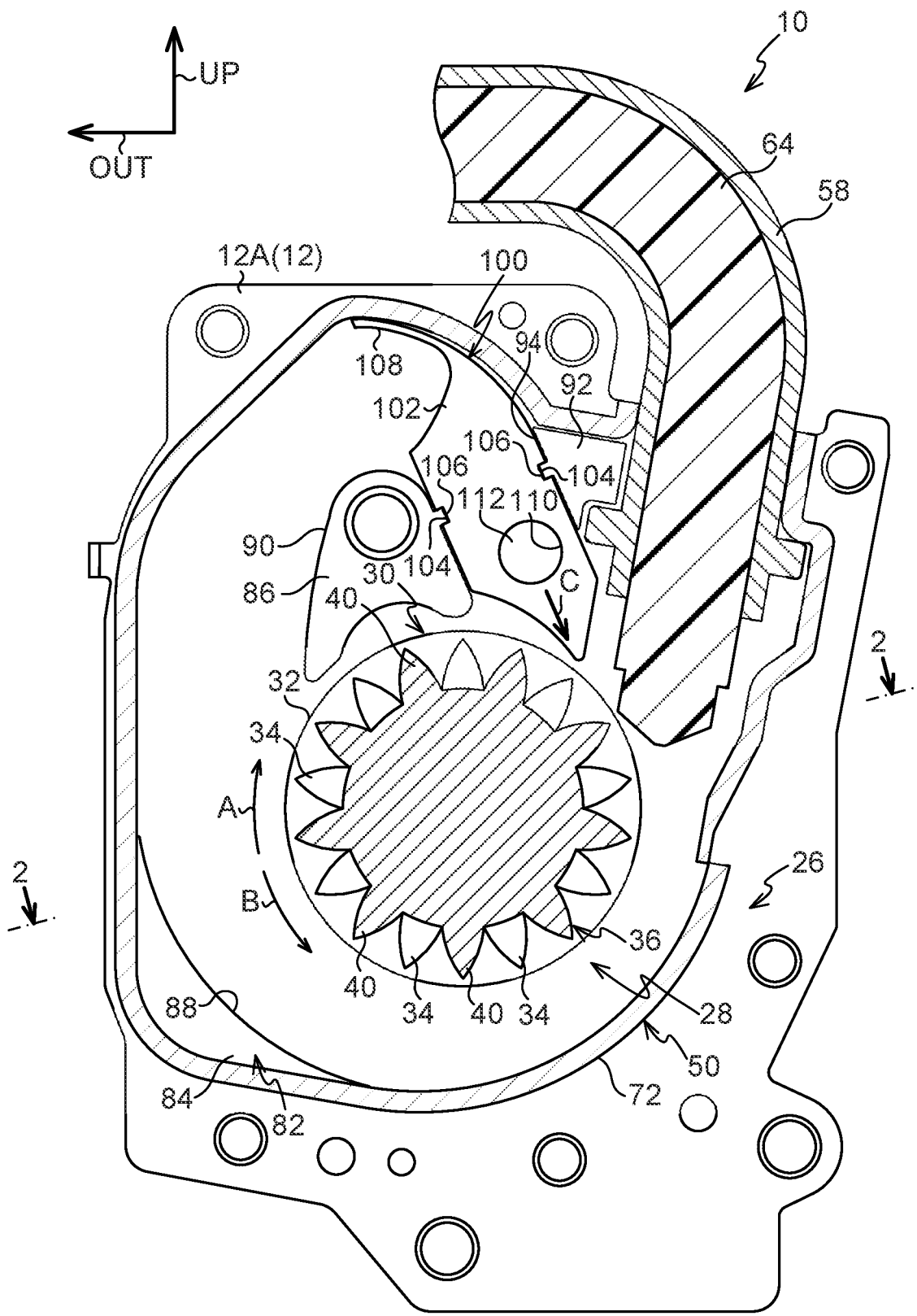
FIG. 3 is a side view of an inside of a cover plate as viewed from a vehicle front side, illustrating a state in which a moving member has moved out of an axial direction leading end of a cylinder.
Figure 4:
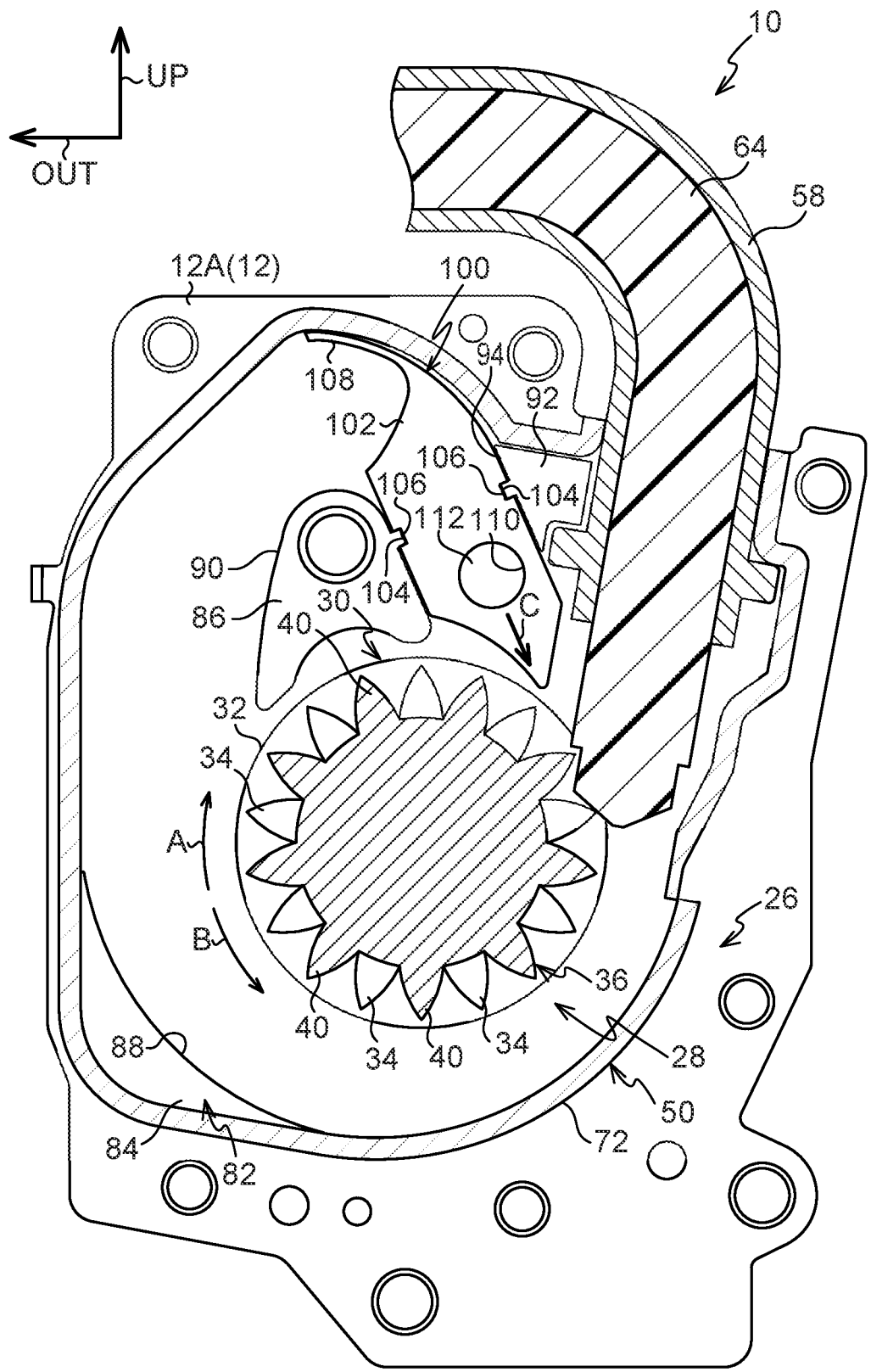
FIG. 4 is a side view corresponding to FIG. 3, illustrating a state in which a conical portion of the moving member has abutted a second tooth of a second rotating section of a rotating member.

When the moving member 64 is further pressed and moved by the sealing ball 62 in a state in which the moving member 64 has reached the axial direction leading end of the cylinder 58, as illustrated in FIG. 3, the moving member 64 moves out of the axial direction leading end of the cylinder 58 toward the vehicle lower side, and enters the inside of the cover plate 50. When the moving member 64 is moved further toward the vehicle lower side in this state, as illustrated in FIG. 4, a length direction leading end side portion of the moving member 64 abuts a first tooth 34 of the first rotating section 30 or a second tooth 40 of the second rotating section 36 of the rotating member 28.

In this state, this first tooth 34 or second tooth 40 is pressed toward the vehicle lower side by the moving member 64, such that rotation force in the take-up direction (the arrow A direction in FIG. 4 etc.) is imparted to the rotating member 28 from the moving member 64. The rotating member 28 is thereby rotated in the take-up direction, and the moving member 64 is moved further toward the vehicle lower side by the pressure from the sealing ball 62.

Figure 5:
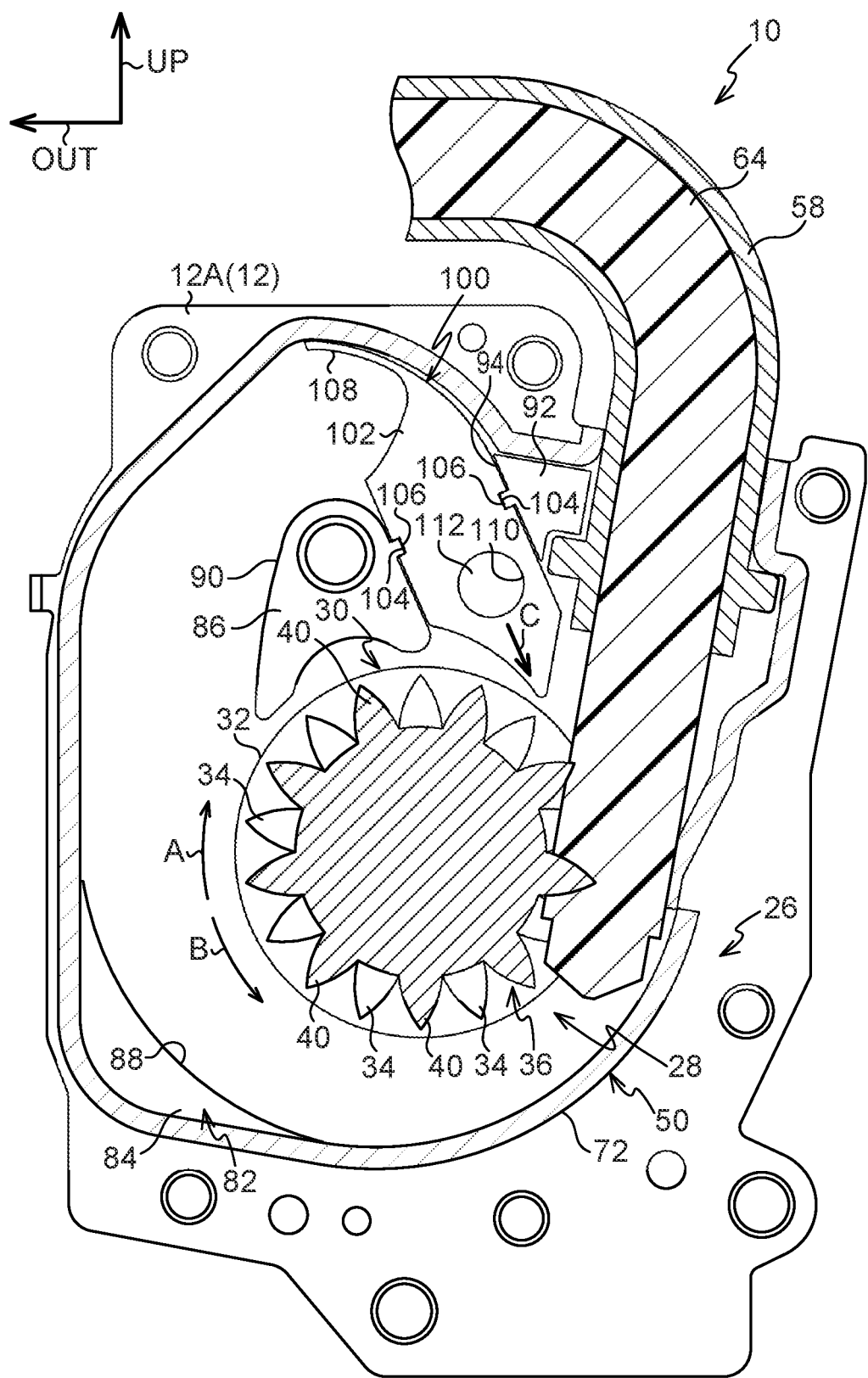
FIG. 5 is a side view corresponding to FIG. 3, illustrating a state in which first teeth and second teeth of the rotating member are biting into or piercing the moving member.

Due to the moving member 64 being moved toward the vehicle lower side and the rotating member 28 being rotated in the take-up direction in this manner, as illustrated in FIG. 5, one out of the first teeth 34 or the second teeth 40 of the rotating member 28 bites into or pierces the moving member 64. When the moving member 64 is moved further toward the vehicle lower side in this state, rotation force in the take-up direction is further imparted to the rotating member 28, such that the rotating member 28 is further rotated in the take-up direction.

As illustrated in FIG. 1 and FIG. 2, the cover plate 50 includes the bottom plate 52, serving as a lever support portion (suppression member support portion). The bottom plate 52 is plate shaped, and a thickness direction of the bottom plate 52 broadly corresponds to the vehicle front-rear directions (the arrow FR direction and the opposite direction thereto in FIG. 1 and FIG. 2). The cover plate 50 also includes a side wall 72 configuring a guide means. The side wall 72 is provided around an outer peripheral portion of the bottom plate 52 of the cover plate 50. As illustrated in FIG. 2, FIG. 3, and so on, the rotating member 28 is disposed at an inner side of the side wall 72.

Figure 6:
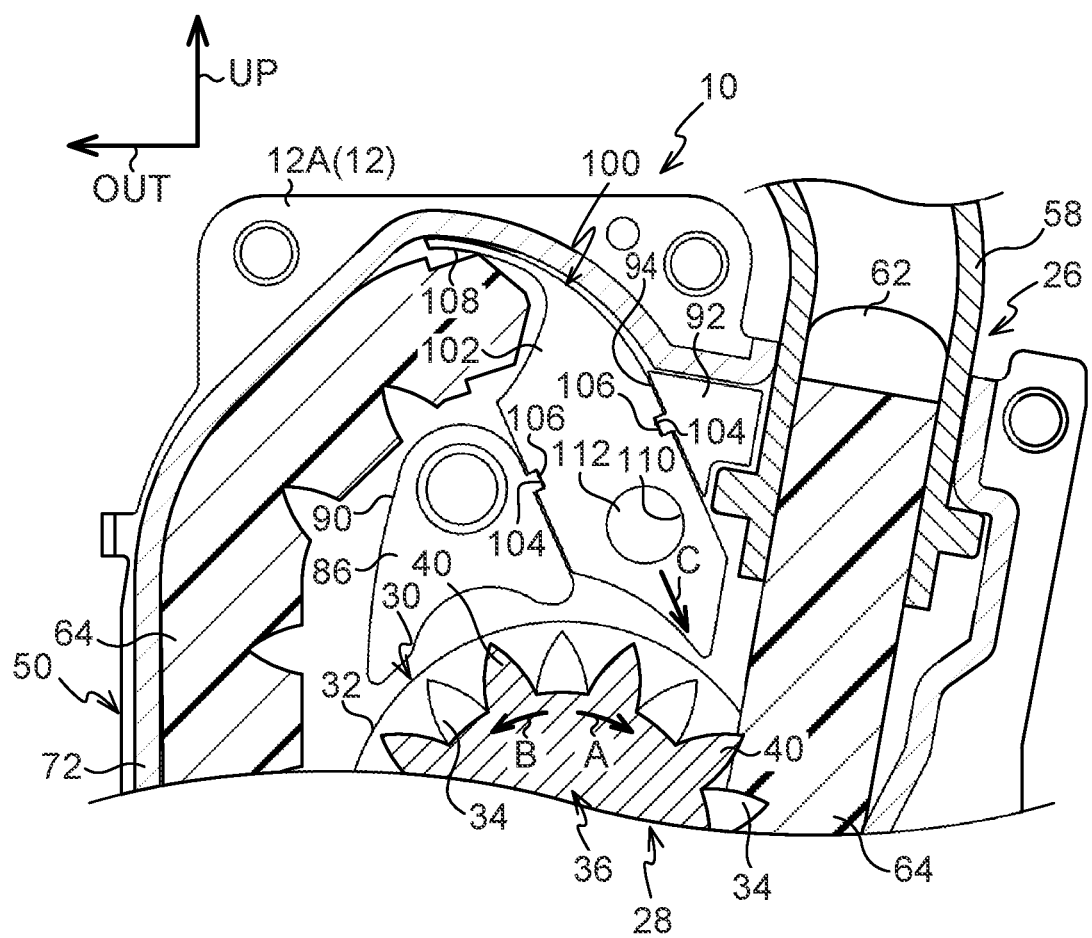
FIG. 6 is a side view corresponding to FIG. 3, illustrating a state in which the moving member has entered inside a stopper recess of the stopper.

As illustrated in FIG. 3, a guide member 82 that, together with the side wall 72, configures the guide means is provided inside the cover plate 50. The guide member 82 includes a first guide section 84 and a second guide section 86. The first guide section 84 is provided at a vehicle lower side end and at a vehicle width direction outer end portion of the inner side of the side wall 72. The first guide section 84 includes a first guide face 88. The first guide face 88 is curved about a center of curvature at the vehicle upper side and at a vehicle width direction inner side of the first guide face 88. When the moving member 64 has been extended out by a predetermined length from the axial direction leading end of the cylinder 58, as illustrated in FIG. 6, the moving member 64 is moved while being guided by an inner face of the cover plate 50 at the side wall 72 of the cover plate 50 and by the first guide face 88 of the first guide section 84.

The second guide section 86 of the guide member 82 is provided further toward the vehicle upper side than the first guide section 84. Outer face and an inner face in the vehicle width direction of the second guide section 86, and an upper face of the second guide section 86 configure a second guide face 90. As illustrated in FIG. 6. to FIG. 8, at a location further toward the vehicle upper side than a vehicle vertical direction intermediate portion of the side wall 72 of the cover plate 50, the moving member 64 enters between an inner face of the side wall 72 and a portion of the second guide face 90 of the second guide section 86 that faces toward an outer side in the vehicle width direction, and is moved while being guided by the inner face of the side wall 72 and by the second guide face 90 of the second guide section 86.

The guide member 82 also includes a third guide section 92. The third guide section 92 includes a third guide face 94. The third guide face 94 opposes an inner side portion in the vehicle width direction of the second guide face 90. When the moving member 64 passes a vehicle uppermost side portion of the second guide section 86, the moving member 64 is guided by the inner side portion of the second guide face 90 and by the third guide face 94, so as to move in a direction inclined toward the vehicle lower side.

The stopper 100 is provided between the second guide section 86 and the third guide section 92 of the guide member 82, as illustrated in FIG. 3. A stopper body 102 serving as a soft portion of the stopper 100 in the present exemplary embodiment is, for example, formed by synthetic resin having a lower cured state rigidity than that of the first rotating section 30 and the second rotating section 36 of the rotating member 28. A width direction of the stopper body 102 is broadly aligned with the vehicle front-rear direction. Thickness directions of the stopper body 102 in an initial state of the stopper 100 (the state illustrated in FIG. 3) are directions broadly opposing the second guide face 90 of the second guide section 86 and the third guide face 94 of the third guide section 92 of the guide member 82.

A pair of grooves 104 are formed in the stopper body 102. One of the grooves 104 is formed in a face on a thickness direction one side of the stopper body 102 so as to open toward the thickness direction one side of the stopper 100. The other of the grooves 104 is formed in a face on a thickness direction other side of the stopper 100 so as to open to the thickness direction other side of the stopper 100.

Protrusions 106 are contained inside these grooves 104. One of the protrusions 106 is formed projecting out from a portion of the second guide face 90 of the second guide section 86 that opposes the third guide face 94 of the third guide section 92. The other of the protrusions 106 is formed projecting out from the third guide face 94 of the third guide section 92. Thus the stopper body 102 is retained by the guide member 82 in the initial state of stopper 100 (the state illustrated in FIG. 3).

The thickness direction one side face of the stopper 100 is curved about a center of curvature that is further toward the vehicle lower side than the thickness direction one side face of the stopper 100. The thickness direction one side face is formed at further toward a length direction leading end side of the stopper body 102 (the arrow C direction side in FIG. 6, etc.) than a length direction intermediate portion of the stopper body 102. Furthermore, an inner face in the vehicle width direction at a length direction leading end of the stopper 100 is configured by a planar face that is substantially parallel to the axial direction of the cylinder 58 at the axial direction leading end of the cylinder 58.

As illustrated in FIG. 3, the stopper 100 such as described above is disposed between the second guide face 90 of the second guide section 86 and the third guide face 94 of the third guide section 92 of the guide member 82. Thus, when the stopper 100 is pressed from a length direction base end side of the stopper 100 by the moving member 64 such that the protrusions 106 inside the grooves 104 snap, the stopper 100 is moved toward a length direction leading end side (the arrow C direction side in FIG. 3) (see FIG. 7).

When, due to such movement of the stopper 100, the length direction leading end portion of the stopper body 102 (the arrow C direction side end portion of the stopper body 102 in FIG. 3) enters a rotation trajectory of the first rotating section 30 and the second rotating section 36 of the rotating member 28, a first tooth 34 of the first rotating section 30 or a second tooth 40 of the second rotating section 36 engages with the length direction leading end portion of the stopper body 102 at a rotating member 28 side. When the first tooth 34 or the second tooth 40 is engaged with the length direction leading end portion of the stopper body 102, the length direction leading end portion of the stopper body 102 is moved, together with the rotating member 28, to the section where a first teeth 34 or a second teeth 40 of the rotating member 28 bite into or pierce the moving member 64.

A stopper recess 108 is formed at the stopper body 102. The stopper recess 108 is formed at a portion of the stopper body 102 further toward the length direction base end side (the opposite side to the arrow C direction in FIG. 6 etc.) than a length direction intermediate portion of the stopper body 102. The stopper recess 108 is open at a face on the thickness direction one side of the stopper body 102. When the moving member 64 is moved toward the length direction leading end side due to pressure of gas generated by actuation of the MGG 60, the length direction leading end portion of the moving member 64 enters inside the stopper recess 108 (see FIG. 6). When the moving member 64 is moved further toward the length direction leading end side from this state, an inside portion of the stopper recess 108 of the stopper body 102 is pressed by the length direction leading end portion of the moving member 64. The stopper 100 is thereby moved toward the length direction leading end side (see FIG. 8).

Moreover, a hole 110 is formed at the stopper body 102. The hole 110 is open at a vehicle front side face of the stopper body 102, with an inner peripheral profile of the hole 110 being circular when viewed from the vehicle front side. A hard portion 112 serving as a resistance portion is provided inside the hole 110. The hard portion 112 is, for example, formed from a metal such as iron or the like, with the hard portion 112 being, for example, harder than the first rotating section 30 and the second rotating section 36 of the rotating member 28. The hard portion 112 has a substantially cylindrical rod shape, with a center axis direction of the hard portion 112 broadly aligned with the width direction of the stopper body 102 (namely, the vehicle front-rear direction). The diameter dimension of the hard portion 112 is not greater than a separation between a tip of a first tooth 34 of the first rotating section 30 and a tip of a second tooth 40 of the second rotating section 36 adjacent to this first tooth 34 along the circumferential direction of the rotating member 28.

Operation and Advantageous Effects of First Exemplary Embodiment

Next, explanation follows regarding operation and advantageous effects of the present exemplary embodiment.

In the webbing take-up device 10, high pressure gas is instantaneously supplied inside the cylinder 58 from the MGG 60 when the MGG 60 of the pre-tensioner 26 is actuated by the ECU in a vehicle collision, which is a vehicle emergency mode. When the sealing ball 62 is moved toward the axial direction leading end side of the cylinder 58 under the pressure of the gas, the moving member 64 is pressed by the sealing ball 62 so as to be moved toward the axial direction leading end side of the cylinder 58.

Due to the moving member 64 being moved toward the axial direction leading end side of the cylinder 58, the length direction leading end side portion of the moving member 64 moves out from the axial direction leading end of the cylinder 58 and toward the vehicle lower side, and the length direction leading end side portion of the moving member 64 abuts a first tooth 34 or second tooth 40 of the rotating member 28 (see FIG. 4). When this first tooth 34 or second tooth 40 is being pressed toward the vehicle lower side by the length direction leading end side portion of the moving member 64 in this manner, the rotating member 28 is imparted with rotation force in the take-up direction (the arrow A direction in FIG. 4, etc.) from the moving member 64. The rotating member 28 is rotated in the take-up direction as a result.

Moreover, due to the rotating member 28 rotating in the take-up direction as illustrated in FIG. 5, out of the plural first teeth 34 and second teeth 40 of the rotating member 28, a first tooth 34 or a second tooth 40 that is further toward the pull-out direction side (the arrow B direction side in FIG. 4, etc.) being pressed by the moving member 64 bites into or pierces the moving member 64 from the outer peripheral face of the moving member 64 toward a radial direction central side of the moving member 64.

Further rotation force is imparted to the rotating member 28 in the take-up direction due to the moving member 64, which has been bitten into or pierced by this first tooth 34 or this second tooth 40, being moved further toward the vehicle lower side, and the rotating member 28 is rotated further in the take-up direction (the arrow A direction in FIG. 5, etc.). This rotation of the rotating member 28 in the take-up direction is transmitted to the spool 18 through the torsion bar 24, such that the spool 18 is rotated in the take-up direction. The webbing 20 is thus taken up onto the spool 18, increasing the restraining force on the occupant from the webbing 20.

However, when the moving member 64 moves at the inside of the side wall 72 of the cover plate 50 due to the moving member 64 being pressed by the sealing ball 62, as illustrated in FIG. 6, the length direction leading end portion of the moving member 64 passes between the side wall 72 of the cover plate 50 and the second guide face 90 of the second guide section 86 of the guide member 82. The length direction leading end portion of the moving member 64 thereby enters inside the stopper recess 108 in the stopper body 102 of the stopper 100. An inside portion of the stopper recess 108 is pressed by the length direction leading end portion of the moving member 64 due to the moving member 64 moving toward the length direction leading end side thereof in this state.

Figure 7:
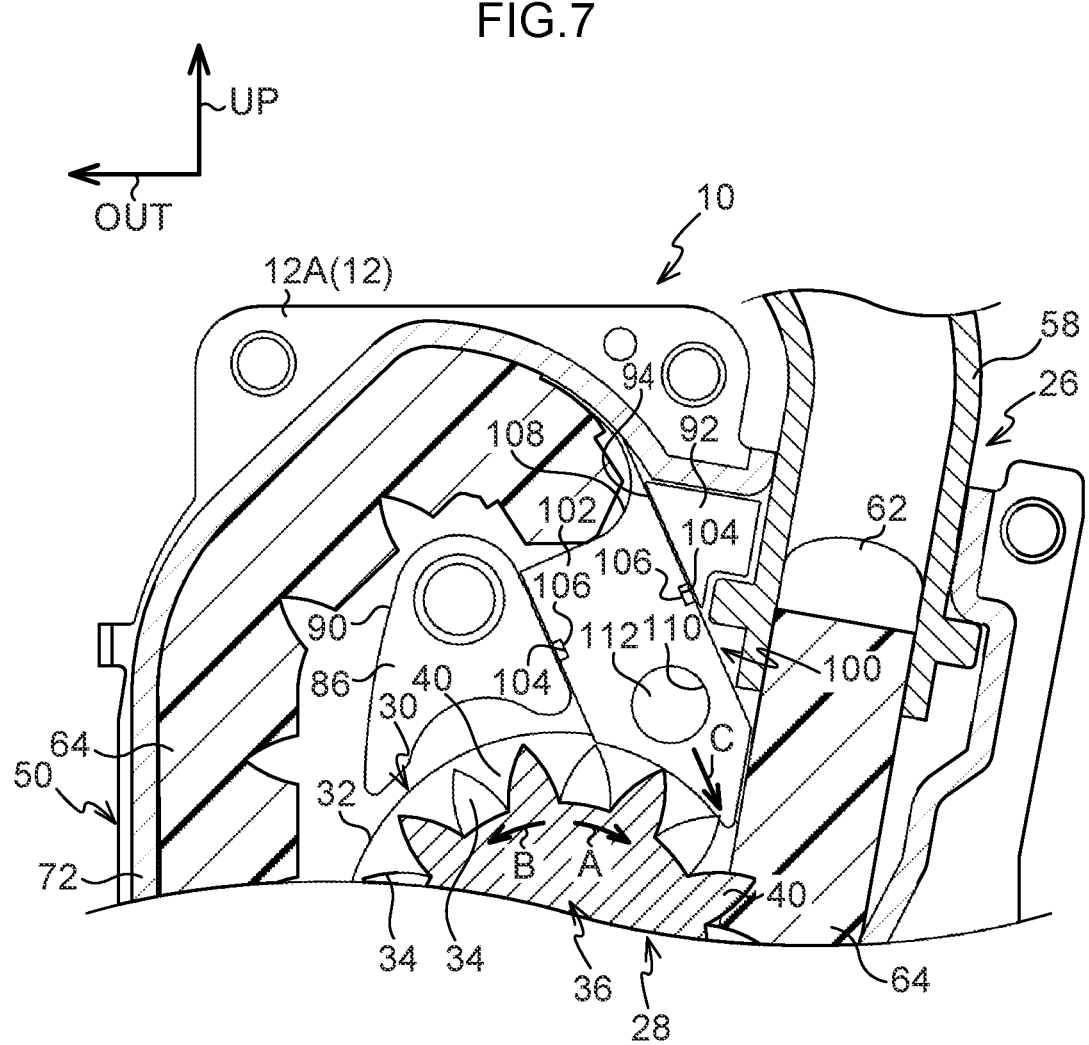
FIG. 7 is a side view corresponding to FIG. 3, illustrating a first tooth of the rotating member engaged with the stopper.

Thus, as illustrated in FIG. 7, the protrusions 106 respectively formed at the second guide section 86 and the third guide section 92 are pressed by the inner walls of the grooves 104 of the stopper 100 and snap as a result. This snapping of the protrusions 106 disengages the retention of the stopper 100 by the guide member 82, and the stopper 100 is moved toward the length direction leading end side of the stopper 100 by the pressing force from the moving member 64 (see FIG. 8).

Such movement of the stopper 100 results in the length direction leading end portion of the stopper body 102 entering into the rotation trajectory of the first rotating section 30 and the second rotating section 36 of the rotating member 28. The stopper body 102 is, for example, formed from a synthetic resin having a lower cured state rigidity than that of the first rotating section 30 and the second rotating section 36. Thus when the length direction leading end portion of the stopper body 102 enters into the rotation trajectory of the first rotating section 30 and the second rotating section 36, a first tooth 34 of the first rotating section 30 or a second tooth 40 of the second rotating section 36 engages so as to bite into or pierce a portion of the stopper body 102 on the rotating member 28 side of the leading end portion of the stopper body 102.

By this first tooth 34 or this second tooth 40 of the rotating member 28 being engaged in this manner so as to bite into or pierce the length direction leading end portion of the stopper body 102, the stopper 100 can be suppressed from being repelled by the first tooth 34 or the second tooth 40 of the rotating member 28. The leading end portion of the stopper body 102 stably moves together with the rotating member 28 toward the moving member 64, which has been out from the axial direction leading end of the cylinder 58 toward the vehicle lower side and has entered inside the cover plate 50. Namely, the leading end portion of the stopper body 102 stably move to the section where the first teeth 34 or the second teeth 40 of the rotating member 28 bite into or pierce the moving member 64.

Figure 8:
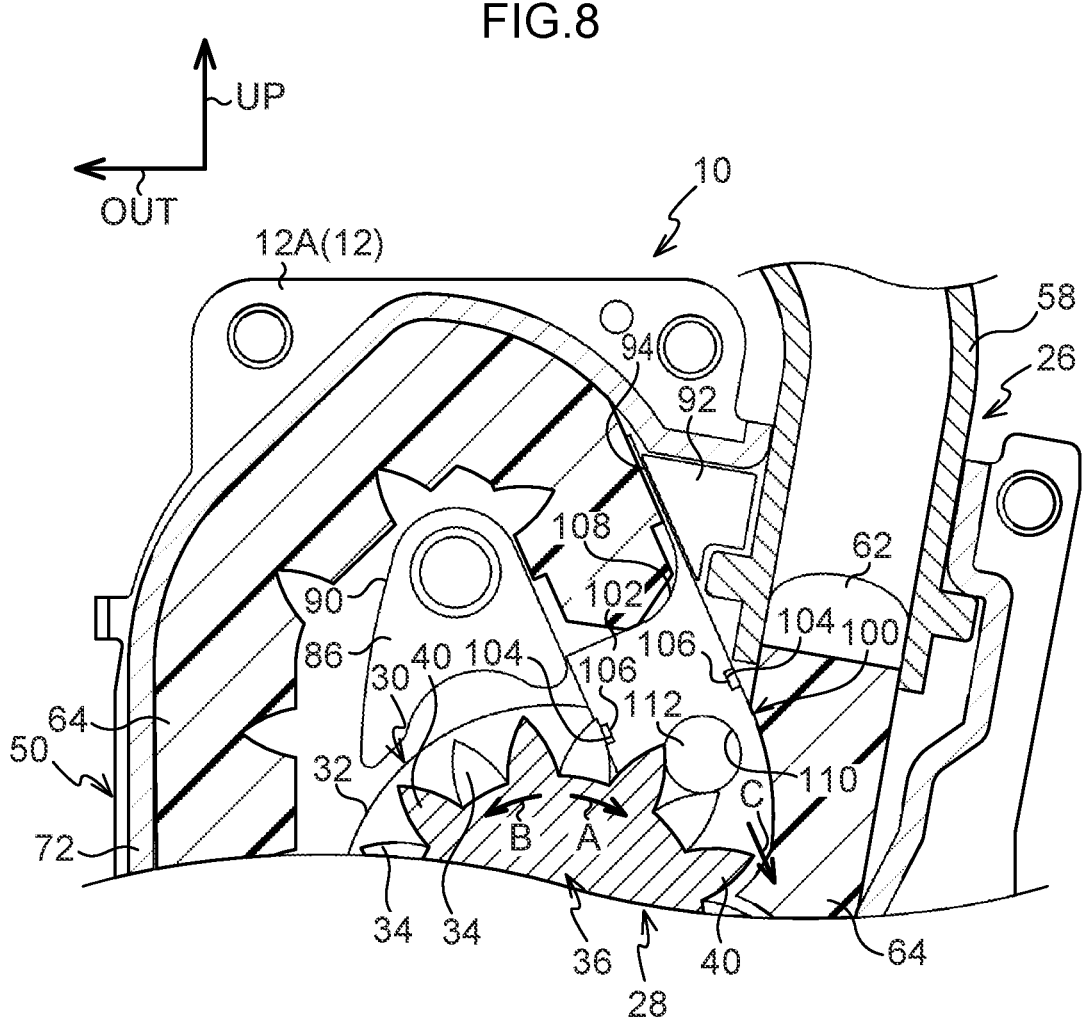
FIG. 8 is a side view corresponding to FIG. 3, illustrating a state in which rotation of the moving member has been suppressed by a hard portion of the stopper.

When the stopper body 102 has moved to the section where the first teeth 34 or the second teeth 40 bite into or pierce the moving member 64, then, as illustrated in FIG. 8, the stopper body 102 is sometimes deformed (including, for example, being broken, crushed, or the like) by the first teeth 34 or the second teeth 40 and the moving member 64.

The hard portion 112 provided at the stopper body 102 is harder than the first rotating section 30 and the second rotating section 36 of the rotating member 28. Thus even if the stopper body 102 configured as described above is deformed by the first teeth 34 or the second teeth 40 and by the moving member 64, deformation of the hard portion 112 by the first teeth 34 or the second teeth 40 and by the moving member 64 is suppressed.

Thus when the hard portion 112 has been moved toward the section where the first teeth 34 or the second teeth 40 bite into or pierce the moving member 64, a first tooth 34 or a second tooth 40, which is disposed at further toward a rotation direction opposite side (upstream side) of the first tooth 34 or the second tooth 40 that has bitten into or pierced the portion of the moving member 64, is limited from biting into or piercing the moving member 64. This enables rotation of the rotating member 28 to be suppressed, such that further movement of the moving member 64 toward the length direction leading end side is suppressed.

This enables the suppression of the moving member 64 from moving such an extent that the length direction base end of the moving member 64 comes out of the axial direction leading end of the cylinder 58. This enables gas supplied into the cylinder 58 from the MGG 60 to be suppressed from escaping through the axial direction leading end of the cylinder 58.

Next, description follows regarding modified examples of the stopper 100 in a second exemplary embodiment and a third exemplary embodiment.

Second Exemplary Embodiment

Figure 9:
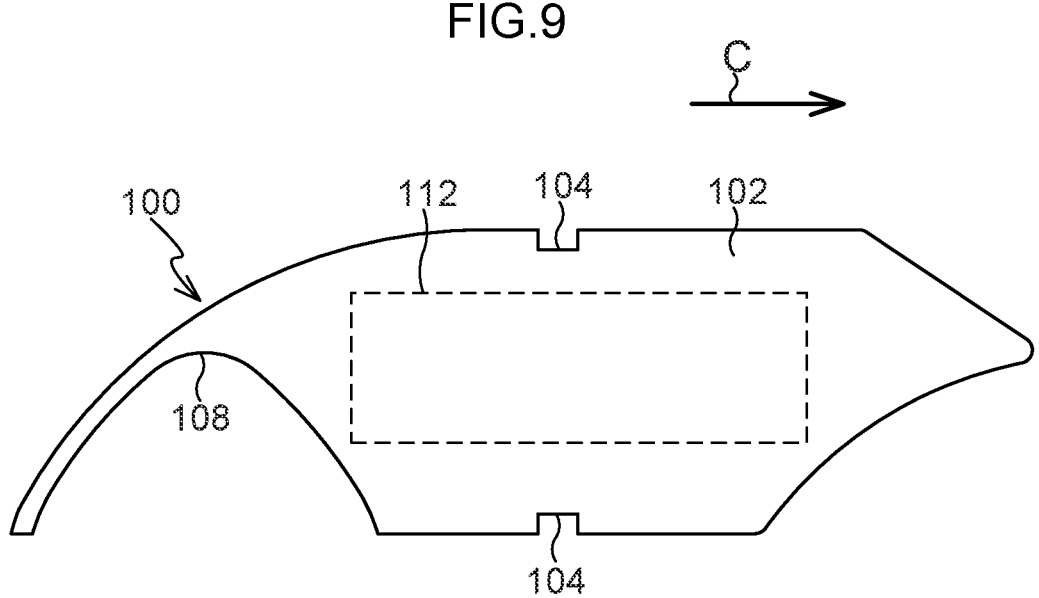
FIG. 9 is a side view of a stopper of a second exemplary embodiment.

As illustrated in FIG. 9, for the hard portion 112 of the second exemplary embodiment, a cylindrical rod shaped hole is formed with its center axis direction along the length direction of the stopper body 102 (the arrow C direction and opposite direction thereto in FIG. 9), and the hard portion 112 is filled inside the stopper body 102. The second exemplary embodiment configured in such a manner exhibits basically the same operation to the first exemplary embodiment, and so basically the same advantageous effects to those of the first exemplary embodiment can be obtained.

Note that the hard portion 112 has a cylindrical rod shape in the first exemplary embodiment and the second exemplary embodiment, and there is a single hard portion 112 therein. However, the hard portion 112 may have another shape, such as a cuboidal shape, a triangular rod shape, or the like, and there may also be plural hard portions 112. Namely, there are no particular limitations to the shape and number of the hard portion 112.

Third Exemplary Embodiment

Figure 10:
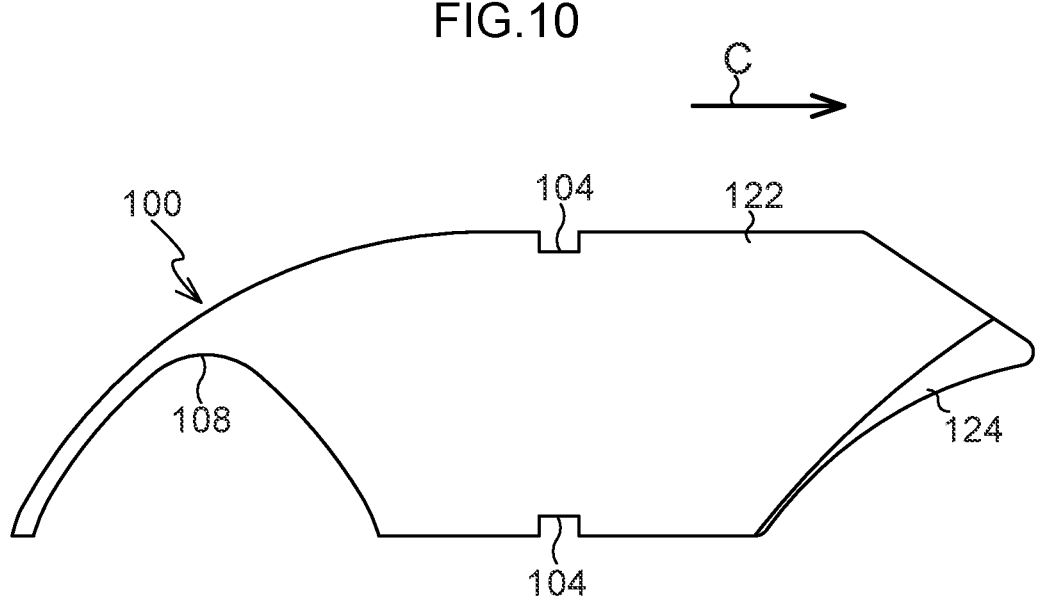
FIG. 10 is a side view of a stopper of a third exemplary embodiment.

As illustrated in FIG. 10, in a third exemplary embodiment, the stopper 100 includes a hard portion 122 serving as a resistance portion and a soft portion 124. The hard portion 122 is, for example, formed from a synthetic resin that in a cured state is harder than the first rotating section 30 and the second rotating section 36 of the rotating member 28. In contrast thereto, the soft portion 124 is, for example, formed from a synthetic resin having a lower cured state rigidity than that of the first rotating section 30 and the second rotating section 36.

The soft portion 124 is formed to at least a portion of a curved face on the rotating member 28 side at the length direction leading end (arrow C direction in FIG. 10) side of the stopper 100. The formation range of the soft portion 124 on the stopper 100 is a range that, from the length direction leading end of the stopper 100, is not less than a separation size that is between a first tooth 34 and a second tooth 40 adjacent to the first tooth 34 in a peripheral direction of the rotating member 28.

Thus when the stopper 100 is moved toward the length direction leading end side of the stopper 100, the end portion on the length direction leading end side of the stopper 100 accordingly enters into the rotation trajectory of the first teeth 34 or the second teeth 40 of the rotating member 28, and a tip of a first tooth 34 or a tip of a second tooth 40 of the rotating member 28 engages so as to bite into or pierce the soft portion 124 of the stopper 100.

Thus by this first tooth 34 or this second tooth 40 of the rotating member 28 engaging by biting into or piercing the soft portion 124 of the stopper 100, the stopper 100 can be suppressed from being repelled by this first tooth 34 or this second tooth 40, enabling the length direction leading end portion of the stopper 100 to be moved together with the rotating member 28 to the section where the first teeth 34 or the second teeth 40 bite into or pierce the moving member 64. The hard portion 122 limits further biting into or piercing of the moving member 64 from this state by a first tooth 34 or a second tooth 40 that is disposed at the opposite side to the rotation direction of the rotating member 28 (upstream side) of the first tooth 34 or the second tooth 40 that has bitten into or pierced the moving member 64.

Namely, the present exemplary embodiment exhibits basically the same operation to the first exemplary embodiment, and so basically the same advantageous effects can be obtained to those of the first exemplary embodiment.

Note that the soft portion 124 may be integrally molded together with the hard portion 122 by so-called "two-color molding", the soft portion 124 and the hard portion 122 may be configured as separate bodies, the soft portion 124 may also be configured fixed to the hard portion 122.

Moreover, in the present exemplary embodiment the synthetic resin for forming the hard portion 122 and the synthetic resin for forming the soft portion 124 are made different to each other. However, for example, the soft portion 124 may be formed with a synthetic resin that is the same as the synthetic resin for forming the hard portion 122, and a portion of the soft portion 124 may be reduced in structural rigidity by hollowing out or the like.

The entire content of the disclosure of Japanese Patent Application No. 2020-84786 is incorporated by reference in the present specification.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A webbing take-up device comprising:
a spool on which webbing of a seatbelt device is taken up by the spool being rotated in a take-up direction;
a rotating member configured such that the spool is rotated in the take-up direction by the rotating member being rotated toward one side;
a tube-shaped cylinder open at an axial direction leading end side;
a fluid supplier provided at an axial direction base end side of the cylinder and supplying a fluid inside the cylinder in a vehicle emergency;
a moving member that is provided inside the cylinder, that is moved toward the axial direction leading end side of the cylinder due to pressure of the fluid, and that rotates the rotating member toward the one side by being moved in a state in which a tooth of the rotating member has bitten into or pierced the moving member; and
a stopper provided further toward a movement direction side of the moving member than a section where the tooth of the rotating member has bitten into or pierced the moving member, the stopper being pressed by a portion of the moving member where biting or piercing of the rotating member has been disengaged, the stopper being engaged by teeth of the rotating member, and the stopper suppressing rotation of the rotating member toward the one side by the stopper being moved toward the section where teeth of the rotating member bite into or pierce the moving member, wherein:
the stopper includes a resistance portion that resists compression by the rotating member and the moving member,
wherein rotation of the rotating member toward the one side is suppressed by the resistance portion that has been interposed between the rotating member and the moving member.

2. The webbing take-up device of claim 1, wherein the resistance portion is harder than a teeth-engagement portion of the stopper.

3. A webbing take-up device comprising:
a spool on which webbing of a seatbelt device is taken up;
a rotating member connected to the spool and rotating toward one side such that the spool is rotated in the take-up direction, the rotating member being formed with a plurality of teeth around a rotation axis of the rotating member;
a tube-shaped cylinder open at an axial direction leading end side;
a fluid supplier provided at an axial direction base end side of the cylinder and supplying a fluid inside the cylinder in a vehicle emergency;
a moving member that is provided inside the cylinder and that is moved toward the axial direction leading end side of the cylinder due to pressure of the fluid, the moving member being configured to rotate the rotating member toward the one side by the moving member being moved further in a state in which a leading end portion of the moving member has come out from the cylinder and a tooth of the rotating member has bitten into or pierced the leading end portion; and
a stopper provided further toward a movement direction side of the moving member than the leading end portion of the moving member, wherein:
along with movement of the moving member, the leading end portion of the moving member, at which biting or piercing of the rotating member has been disengaged, is configured to press the stopper; and
the stopper is engaged by teeth of the rotating member, is configured to be moved toward a section where teeth of the rotating member bite into or pierce the moving member, and to suppress rotation of the rotating member toward the one side by the moving member, wherein:
the stopper includes a hard portion and a soft portion;
the soft portion is engaged by the teeth of the rotating member and is moved to a section where the teeth of the rotating member bite into or pierce the moving member; and
the hard portion suppresses rotation of the rotating member toward the one side by the moving member.

4. The webbing take-up device of claim 3, wherein the hard portion is harder than the teeth of the rotating member.

* * * * *